United States Patent

Inman et al.

[15] 3,700,709
[45] Oct. 24, 1972

[54] AZOMETHINE PIGMENTS

[72] Inventors: Eric Richard Inman, Bridge of Weir, Renfrewshire; Ian Alexander MacPherson, Paisley; John Andrew Stirling, Glasgow, all of Scotland

[73] Assignee: Ciba-Geigy AG, Basel, Switzerland

[22] Filed: May 20, 1970

[21] Appl. No.: 39,163

[52] U.S. Cl............260/438.1, 106/288 Q, 106/309, 241/30, 260/41 C
[51] Int. Cl.............................................C07f 11/00
[58] Field of Search.........260/438.1; 106/288 Q, 309

[56] References Cited

UNITED STATES PATENTS

| 2,116,913 | 5/1938 | Schmidt...............260/438.1 X |
| 2,239,290 | 4/1941 | Krzikalla et al.....260/438.1 X |
| 2,282,936 | 5/1942 | Chenicek.............260/438.1 X |
| 2,442,200 | 5/1948 | Downing..............260/438.1 X |
| 3,440,254 | 4/1969 | Lenoir.................260/438.1 X |
| 2,381,952 | 8/1945 | Gubelmann.........260/438.1 X |

FOREIGN PATENTS OR APPLICATIONS

| 1,122,938 | 8/1968 | Great Britain.........106/288 Q |
| 1,123,859 | 8/1968 | Great Britain.........106/288 Q |

*Primary Examiner*—Tobias E. Levow
*Assistant Examiner*—H. M. S. Sneed
*Attorney*—Wenderoth, Lind & Ponack

[57] ABSTRACT

Copper complexes of substituted 2,2'-dihydroxyphenylnapthyl-azomethines are prepared by reacting the products of o-hydroxy-naphthaldehydes and o-aminophenols with a coppering agent. Said compounds are pigments for organic materials.

17 Claims, No Drawings

AZOMETHINE PIGMENTS

DETAILED DESCRIPTION

The present invention relates to substituted azomethine compounds having valuable pigmentary properties. The present invention relates in particular to azomethine coloring matters suitable for the pigmentation of paints, lacquers, printing inks, rubber, artificial polymeric materials, paper and textile materials or other materials, and to processes of producing these azomethine substances.

It is known from U.S. Pat. specification No. 2,166,913 that an olive azomethine pigment dye may be obtained by reaction of ortho-hydroxybenzaldehyde with ortho-aminophenol and copper acetate. This dye may be converted by certain finishing methods into a form in which it can be used in the pigment industry, for instance by grinding with salt followed by treatment with solvent, but the resulting pigment has inferior properties, in particular lacking color strength and stability to acids.

We have found that novel azomethine compounds as hereinafter described, when used as pigments, have greatly improved pigmentary properties in terms of good color strength and acid stability combined with excellent fastness properties, particularly to weathering, in finishes of industrial importance.

According to the present invention, there is provided a substituted azomethine compound having the formula:

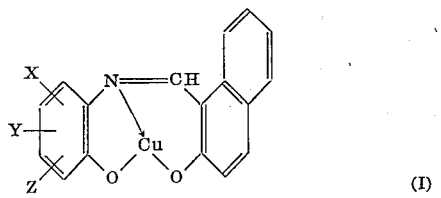

(I)

wherein X, Y and Z represents hydrogen, and/or nitro, amido, carbamoyl substituted by aryl, such as phenyl, arylsulphonyl, such as phenylsulfonyl, alkyl or alkoxy having one to four carbon atoms or alkyl sulfamoyl wherein each each alkyl group has one to four carbon atoms, with the proviso that at least one of the groups X, Y and Z is different from hydrogen.

If the substitution represented by X, Y and/or Z comprises halogen, the halogen is preferably chlorine or bromine, and if it comprises alkyl or alkyl sulfamoyl, each alkyl moiety of the substitution is preferably methyl.

Preferred compounds of the present invention are compounds of Formula I in which Y and Z represent hydrogen. Especially preferred compounds have Formula I in which X represents a chlorine atom or a nitro group, as they are or can provide pigments having particularly useful shades having optimal fastness properties, especially fastness to crosslacquering, light and solvents.

The present invention also provides a process of producing a compound of formula I which comprises reacting a Schiff's base having the formula:

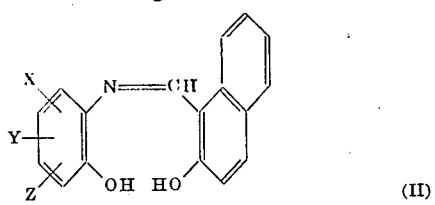

(II)

with a coppering agent, wherein X, Y and Z have the previous significance.

The coppering agent may be a conventional agent used in the production of copperized compounds, and is conveniently a solution of a cupric salt, for example Copper (II) acetate. The reaction maybe carried out under a wide variety of reaction conditions, but conveniently the Schiff's base of formula II is heated with the copperizing agent at a temperature within the range of from ambient to 150° C., an elevated temperature within the range of from 80° to 100° C. being particularly preferred. The reaction may be carried out in an organic solvent which is substantially inert under the conditions of the reaction, for instance formamide, dimethyl formamide, N-methylpyrrolidine, glycol monomethyl ether, isobutanol or glacial acetic acid. Conveniently the solvent used is the same solvent employed to form a solution of the cupric salt coppering agent.

If desired, the Schiff's base of formula II may be prepared during the course of the process by the reaction of the orthohydroxy-aldehyde having the formula:-

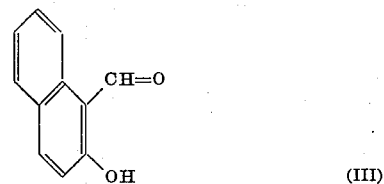

(III)

with an ortho-aminophenol having the formula:

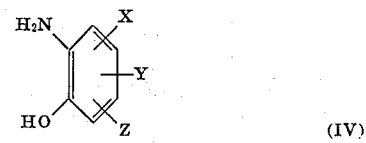

(IV)

wherein X,Y and Z have their previous significance. Examples of orthoaminophenols which may be used to produce products of especial value as pigments are 4-nitro-2-aminophenol, 4-chloro-2-aminophenol, 3-amino-4-hydroxy-benzanilide and 4-chloro-5-nitro-2-aminophenol.

As a further variation of the process of the present invention, the desired azomethine compound of formula I may be produced under aqueous conditions in the absence of an organic solvent by reacting an alkaline solution of an ortho-aminophenol of formula IV with an alkaline suspension of the aldehyde of formula III, acidifying the resultant product (for example with acetic acid) and adding the coppering agent to the suspension of the Schiff's base of formula II so formed. If desired, the azomethine suspension may be filtered, the azomethine paste washed and then resuspended before the addition of the coppering agent. The coppering agent may be aqueous cupric sulphate solution containing sufficient sodium acetate present in solution to maintain the pH value above 3. Alternatively a solution of a cuprammonium salt may be used. Surface active agents may also be used if desired. By this variation of the process of the invention colored products may be obtained in a finely divided form which are usable directly as pigments.

The present invention also provides a second process of producing a compound of formula I which comprises reacting an azomethine derivative having the formula:

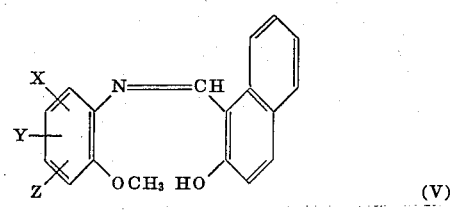

wherein X, Y and Z have their previous significance with at least one molecular equivalent proportion of a coppering agent.

The process is conveniently effected in the presence of an organic solvent which is at least substantially inert under the conditions of the reaction, for instance dimethyl formamide. As this second process of the invention entails the splitting of the ether linkage, a higher reaction temperature is in general required than that in the first process of the invention. The preferred reaction temperature is within the range of from 140° to 180° C.

The compounds of formula I have valuable pigmentary properties and may, if desired, be bought into pigmentary form by conventional conditioning methods. The pigments are distinguished by their high color strength, high resistance to solvents, outstandingly good lightfastness in lacquer printing and intaglio printing, outstandingly good fastness to over-lacquering, and especially by their excellent resistance to weathering.

Accordingly, the present invention also provides a process of producing a pigment which comprises conditioning a substituted azomethine compound of formula I. The present invention also comprises pigments so produced, and organic materials colored by the pigments of the invention.

The desired azomethine compound of formula I need not be pre-formed before the conditioning is carried out; it may be prepared during the course of the conditioning procedure. For example, the desired azomethine compound of formula I may be produced by reacting together an ortho-aminophenol of formula IV with the aldehyde of formula III and then a coppering agent while conditioning is carried out simultaneously, for instance in a horizontally rotating gravity grinder (for example, a ball-mill), a grinder operated by a vertically rotating shaft, especially a sand grinder, or in a grinder operated by vibratory action or by any other comminution method compatible with the presence of the chemical reactants. In this type of conditioning, a water soluble copper salt such as cupric sulphate, conveniently in the hydrated form, is particularly suitable as the coppering agent, especially in the presence of an acid buffer such as sodium acetate. If desired, a surface-active agent may also be used in these conditioning techniques.

Known conditioning techniques may be used, for example, grinding with calcium chloride, sodium chloride or other organic or inorganic salt, with or without the addition of dimethylaniline, xylene, or other organic solvent; or heating with a high-boiling organic solvent, for instance, nitrobenzene or α-chloronaphthalene. The compounds of formula I may also be dispersed in water if desired, for example, by means of pebble milling in the presence of a surface active agent which may be of the anionic, cationic or non-ionic type.

The pigments produced in accordance with this invention may be of a shade ranging from greenish yellow to red brown depending on the nature of the substituted azomethine molecule and on the conditioning technique employed. The pigments of this invention are suitable for use in the pigmentation, by known methods, of high molecular weight hydrophobic organic material, for instance paints, lacquers, printing inks, rubber, synthetic polymeric materials, paper and textile materials. In general, pigments of this invention exhibit good fastness properties, especially to light, heat, cross-lacquering and migration, and resistance to organic so solvents, such as trichloroethylene, toluene and methyl ethyl ketone.

The present invention also comprises the coloration of an organic material with a substituted azomethine compound of formula I, together with organic materials when so colored.

The coloration may be carried out, for example, by preparing the substituted azomethine compound of formula I in a finely divided state and incorporating it into the organic material in a conventional manner. The pigment may be prepared in a finely divided state, for instance, by milling with anhydrous sodium acetate in the presence of a minor proportion of xylene, or by other conventional pigment conditioning procedure.

The high molecular weight hydrophobic organic material or other organic material to be colored according to the invention may be any polymeric or other organic material capable of being pigmented or otherwise colored. The material may be a natural or synthetic polymer or co-polymer, a coating composition for application to the surface of an article, or a printing liquid medium. However, the process of the invention is applicable with particular advantage to the pigmentation of natural or synthetic polymers or co-polymers, in the form of fibers, films or bulk material; to paints, lacquers and other surface coating compositions, or to tinting compositions for use in preparing such coating compositions; and to printing inks. Examples of polymers or co-polymers which may be pigmented by the process are vinyl chloride or acrylonitrile polymers and copolymers; polyethylene, polypropylene and other polyolefines; polyacrylonitrile, polystyrene and polystyrene copolymers; and natural and synthetic rubbers.

The present invention is further illustrated by the following Examples. Parts and percentages shown therein are expressed by weight.

EXAMPLE 1

51.3 parts of 4-nitro-2-aminophenol, and 57.3 parts of 2-hydroxy-1-naphthaldehyde were refluxed for 1 hour in 400 parts of dimethyl-formamide. The yellow suspension was allowed to cool for 1 hour and a solution of 66.6 parts of cupric acetate in 600 parts of dimethylformamide was added. The mixture was again refluxed for 1½ hours, and the solid was then filtered off, washed with dimethylformamide and with methanol and dried at 60° C.

In this way there were obtained 107.5 parts of light green metallic crystals having a melting point of >360° C.

The product had the formula;

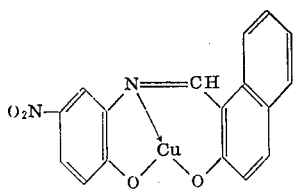

The product was obtained as a fine powder by ball milling with nine times its weight of a mixture of sodium acetate and sodium sulphate. The resulting pigment was isolated by washing with water and was a fine greenish yellow powder.

EXAMPLE 2

15.4 parts of 2-amino-4-nitrophenol and 17.2 parts of 2-hydroxy-1-naphthaldehyde were refluxed in 150 parts of 2-methoxyethanol for 2 hours. After cooling dull-orange crystals (m.pt. 299°–301° C.) were filtered off, washed with ethanol and dried at 60° C. 4.62 parts of this product, dissolved in 50 parts of 2-methoxyethanol, was treated with 3.39 parts of cupric acetate monohydrate, dissolved in 50 parts of dimethylformamide and the mixture was refluxed for 1 hour. The resulting green crystalline product was filtered off, washed with dimethylformamide and ethanol and dried at 60° C. to give a 92 percent yield.

The product may be conditioned as in Example 1, and had the formula:

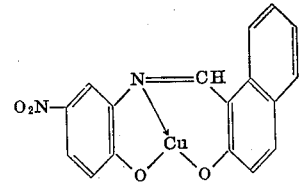

By substituting an equivalent amount of the appropriate aminophenol for the 4-nitro-2-aminophenol used in Examples 1 and 2 the compounds in the following Table were obtained. The Table also gives the color in lacquer and a summary of the fastness properties of the pigments.

| Example | Aminophenol | Product | Colour in Lacquer | Stability |
|---|---|---|---|---|
| 3 | $O_2N$—⌬—$NH_2$, —OH, —Cl | (Cu complex with $O_2N$, Cl substituents) | Brownish yellow | Good. |
| 4 | Cl—⌬—$NH_2$, $O_2N$—, —OH | (Cu complex with Cl, $O_2N$ substituents) | Orange red | Excellent. |
| 5 | $H_3C$—⌬—$NH_2$, —OH, —$NO_2$ | (Cu complex with $H_3C$, $NO_2$ substituents) | do | Very good. |
| 6 | $H_3C$—⌬—$NH_2$, —OH | (Cu complex with $H_3C$ substituent) | Brownish yellow | Excellent. |
| 7 | $C_6H_5SO_2$—⌬—$NH_2$, —OH | (Cu complex with $C_6H_5SO_2$ substituent) | Greenish yellow | Do. |
| 8 | $C_6H_5\cdot NHCO$—⌬—$NH_2$, —OH | (Cu complex with $C_6H_5NHCO$ substituent) | do | Do. |

| Example | Aminophenol | Product | Colour in Lacquer | Stability |
|---|---|---|---|---|
| 9 | Cl-C6H3(NH2)(OH) | Cl-substituted salicylaldimine-naphthol Cu complex | Golden yellow | Excellent |
| 10 | Cl-C6H3(NH2)(OH) with Cl | Dichloro salicylaldimine-naphthol Cu complex | ...do... | Do. |
| 11 | Cl2-C6H2(NH2)(OH) with Cl | Trichloro salicylaldimine-naphthol Cu complex | ...do... | Very good. |

EXAMPLE 12

18.0 parts of 2-amino-3,5.6-tribromoanisole, 8.6 parts of 2-hydroxy-1-naphthaldehyde and 121 parts of 2-methoxyethanol were mixed and refluxed for 30 minutes before the addition of a hot solution of 10 parts of cupric acetate monohydrate in 95 parts of dimethylformamide. This solution was refluxed for 4 hours to give a dark suspension which was filtered hot, the product washed with 2-methoxyethanol, followed by methanol and dried. There were thus obtained 5.2 parts of dull yellow powder which did not melt below 360° C. and which had a copper content of 12.4 percent.

The product had the formula:

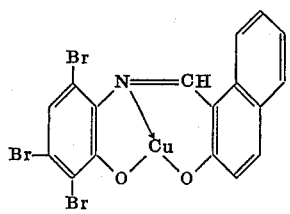

The product was obtained as a fine powder powder by ball-milling with nine times its weight of sodium acetate and sodium sulphate. The resulting pigment was isolated by washing with water, and was a fine greenish yellow powder.

EXAMPLE 13

50.4 parts of 2-amino-4-nitro anisole and 51.6 parts of 2-hydroxy-1-naphthaldehyde were refluxed in 450 parts of 2-methoxyethanol for 2 hours. After cooling yellow crystals (m.pt. 221°-2° C) were filtered off, washed with ethanol and dried at 60° C in 97.5 percent yield.

9.66 parts of this yellow material, dissolved in 100 parts of 2-methoxyethanol were treated with 5.99 parts of cupric acetate monohydrate dissolved in 100 parts of dimethylformamide, and the mixture was refluxed for 1½ hours. The resulting green crystalline product was filtered off, washed with dimethylformamide and ethanol and dried at 60° C. in 69.2 percent yield.

The product may be conditioned as in Example 1, and had the formula:

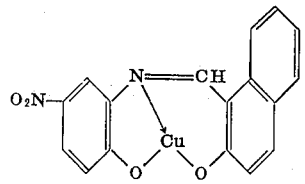

By substituting an equivalent amount of the appropriate amino-anisole for the 4-nitro-2-amino-anisole used in Example 13 or the 2-amino-3,5,6-tribromo-anisole used in Example 12, the products in the following Table were obtained. The Table also gives the color in lacquer and a summary of the fastness property of the pigments.

| Example | Aminophenol | Product | Colour in lacquer | Stability |
|---|---|---|---|---|
| 14 | Br-⟨⟩-NH₂, -OCH₃ | (structure with Br, N=CH, Cu, O, naphthyl) | Yellow | Good |
| 15 | OCH₃, -NH₂, SO₂N(C₂H₅)₂ | (C₂H₅)₂NSO₂- (structure with N=CH, Cu, O, naphthyl) | Greenish yellow | Do. |
| 16 | OCH₃, -NH₂, CONH₂ | H₂NCO- (structure with N=CH, Cu, O, naphthyl) | Yellow | Do. |

EXAMPLE 17

15.4 parts of 4-nitro-2-aminophenol, 17.2 parts of 2-hydroxy-1-naphthaldehyde, and 100 parts of water were stirred for 5 minutes before the addition of 4.2 parts of sodium hydroxide, dissolved in 50 parts of water, followed by 15.6 parts of sodium bisulphite. The suspension was then heated to 90° C. with stirring for 15 minutes and filtered and the product obtained washed with 500 parts of cold water. The yellow presscake was stirred into 200 parts of water with high speed shear agitation, and to this slurry was added a solution of cuprammonium sulphate prepared by dissolving 27.5 parts of hydrated copper sulphate in 100 parts of water, and adding 53 parts of concentrated ammonium hydroxide solution to dissolve the initial precipitate. The slurry was heated to 95° C. for 60 minutes to give a dull yellow slurry which was filtered hot, and the product obtained washed with hot water and dried at 70° C. Thus were obtained 32.0 parts of dull yellow powder which did not melt below 360° C.

EXAMPLE 18

14.35 parts of 4-chloro-2-aminophenol, 17.2 parts of 2-hydroxy-1-naphthaldehyde and 100 parts of water were stirred for 5 minutes before the addition of 4.2 parts of sodium hydroxide dissolved in 50 parts of water, followed by 15.6 parts of sodium bisulphite. The suspension was then heated to 90° C. for 15 minutes, filtered and the product washed with 500 parts of water. The yellow presscake was stirred into 200 parts of water with high speed shear agitation and 30 parts of sodium acetate trihydrate dissolved in 100 parts of water were added. After 15 minutes stirring a solution of 27.5 parts of hydrated copper sulphate in 75 parts of water was added and the slurry heated to 90° C. for 60 minutes. The mixture was then filtered hot, the product washed with 8,000 parts of hot water and dried. Thus were obtained 38.6 parts of yellow-brown powder, which did not melt below 360° C.

EXAMPLE 19

A mixture of 14.2 parts of 4-chloro-2-aminophenol, 17.2 parts of 2-hydroxy-1-naphthaldehyde, 200 parts water and 200 parts ceramic balls (half-inch diameter) was placed in a pot mill and ground for 24 hours. To the ground mixture were added 27.2 parts of sodium acetate trihydrate, 26 parts cupric sulphate pentahydrate, both as solids and 100 parts of water. Grinding was then continued for a further period of 90 hours.

The ceramic balls were then separated off by a coarse mesh sieve and the remainder of the mixture was filtered, and the product washed with water and dried at 60° C. The resulting pigment was a yellowish brown powder melting point above 360° C.

The product had the formula:

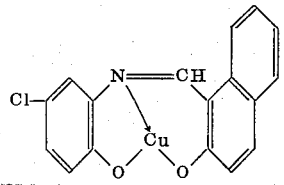

EXAMPLE 20

The dihydroxy azomethine copper II complex prepared in Example 1 together with a variety of other dihydroxy azomethine copper II complexes were incorporated into stoving lacquers.

In each case, a paste was formulated consisting of 1 part of the pigment and 3 parts of "Uresine B" (a commercial carbamate resin). The medium in each case was prepared by mixing 50 parts of a 60 percent solution of "Beckosol 3246" (a coconut glycol alkyd resin of the non-drying type) in xylene, with 30 parts of 2-methoxy ethanol. The lacquers were then prepared in the conventional manner and a film of each sample was applied to cardboard. The stoving time was 30 minutes at 120° C.

The pigmentations made were: a 3 percent mixture comprising 0.3 parts of the pigment in 10 parts of the total mixture and a tint shade reduced 1:100 with titanium dioxide. The overlacquering fastness was measured by overlacquering the film on cardboard with white lacquer containing 20 percent titanium dioxide and re-stoving at 120° C. for 30 minutes. The resultant staining of the white film was then assessed. Heat stability was assessed after re-stoving samples of the lacquer films at 120° C. for 30 minutes and at 180° C. for 15 minutes. The lightfastness was assessed after exposure to a xenon arc lamp by comparison with the Blue Wool Scale [British Standard 1006(1961)]. The lightfastness, heat stability and overlacquering fastness were all found to be excellent.

EXAMPLE 21

The dihydroxy azomethine copper II complex prepared in Example 17 was incorporated into an emulsion paint.

A paste was formed consisting of 20 parts of the pigment, 80 parts of water and 2.5 parts of the sodium dinaphthylmethane disulphonate sold under the Trade Mark Belloid SFD and milled for 48 hours with 60 parts of coarse quartz sand. The sand was removed by sieving. 0.3 parts of this paste were mixed with 30 parts of polyvinylacetate emulsion and stirred until a homogeneous mixture was obtained, and a film of the sample was applied to cardboard. A bright yellow pigmentation with excellent properties was obtained.

EXAMPLE 22

15 parts of the product of Example 10 were stirred into 500 parts of dimethylformamide until a smooth dispersion was obtained. This dispersion was diluted with 8000 parts of dimethylformamide. To this suspension were added 1500 parts of polyacrylonitrile powder and the mixture stirred at high speed until a smooth dope had been obtained. After deaeration the dope was suitable for the preparation of films and filaments since the pigment was present in a highly dispersed form, no large particles being visible. Films of 20 thousandths of an inch thickness were drawn down on glass and dried immediately at 120° C. for 15 minutes. Bright, strong, transparent yellow films were thus obtained which show excellent fastness to light.

EXAMPLE 23

Various of the copper complexes of the invention were prepared in a finely divided state by milling with anhydrous sodium acetate and sodium sulphate in the presence of xylene. The product of Example 17 when prepared in a finely divided state as described above was suitable for incorporation into polyvinylchloride films of the following formulation:
    100 parts of "Geon 121" polyvinylchloride
    60 parts of dialphenylphthalate
    3 parts of Advastab B.C. 247 (Ba/Ca salt of long chain fatty acid)
    1 part of Advaplast 39 (an epoxy soya bean oily condensate
(Geon, Advastab and Advaplast are registered Trade Marks. The dialphenylphthalate is the diester from phthalic acid and the commercially available mixture of alcohols known as "Alphanol")

Two pigmentations were made, one as a full-shade pigmentation using 1 percent of pigment based on the polyvinylchloride content of the formulation, the other being a shade reduction pigmentation using 0.1 percent of the pigment together with 1 percent of titanium dioxide, both percentages being based on the polyvinylchloride content of the formulation. The films were prepared and cured in the conventional way, the normal film thickness in each case being 1/50th of an inch and curing being carried out at 170° C. for 15 minutes.

There resulted strong bright yellow films the full-shade being especially highly transparent. These films exhibited very high fastness properties for instance to light and to migration.

What we claim is:

1. A compound of the Formula

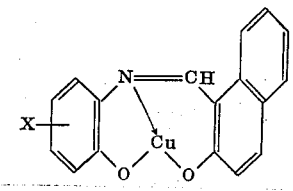

wherein X represents from one to three substituent groups which are the same of different and each is a halogen atom or a nitro, amido, arylcarbamoyl, arylsulphonyl, alkoxy or alkyl group.

2. The compound as claimed in claim 1 wherein X is a chlorine atom or a nitro group.

3. The copper complex compound having the formula

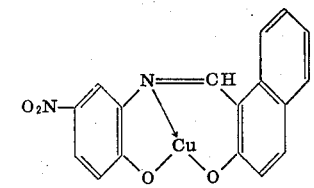

4. The copper complex compound having the formula

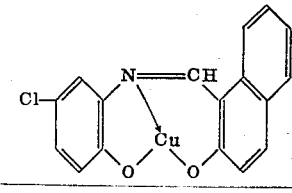

5. A process of producing a pigment comprising finely dividing a compound of formula I as defined in claim 1.

6. A process as claimed in claim 5 wherein the fine division is effected in a horizontally rotating gravity grinder, a grinder operated by a vertically rotating shaft or a grinder operated by vibratory action.

7. A process as claimed in claim 5 wherein the compound of formula I is produced by reacting an ortho-aminophenol of the formula

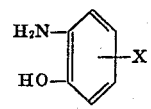

wherein X has the same meaning as in claim 18, with an orthohydroxy aldehyde of the formula

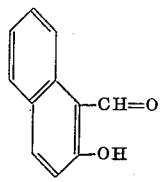

and reacting the resultant product with a coppering agent, fine division of the compound of formula I being carried out simultaneously with its production.

8. A process for the production of a compound according to claim 1 in pigmentary form which comprises reacting, under aqueous conditions in the absence of an organic solvent, an alkaline solution of a compound of the formula

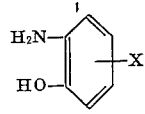

wherein X is as defined in claim 1 with an alkaline suspension of a compound of the formula

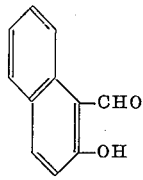

acidifying the resultant product and adding to the acidified product a coppering agent.

9. A process for the production of a compound according to claim 1 which comprises reacting a compound of the formula

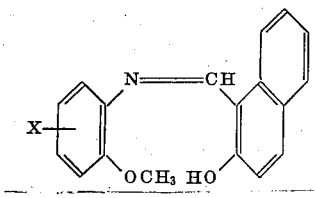

wherein X is as defined in claim 1, with at least one molar equivalent proportion of a coppering agent at a temperature of 140°–180° C.

10. The process according to claim 8, wherein X is halogen, nitro, amido, phenylcarbamoyl, phenylsulphonyl, alkoxy of one to four carbon atoms or alkyl of one to four carbon atoms.

11. The process according to claim 10, wherein the halogen group is chlorine or bromine.

12. The process according to claim 9, wherein X is halogen, nitro, amido, phenylcarbamoyl, phenylsulphonyl, alkoxy of one to four carbon atoms or alkyl of one to four carbon atoms.

13. The process according to claim 12, wherein the halogen group is chlorine or bromine.

14. The compound according to claim 1, wherein X is halogen, nitro, amido, phenylcarbamoyl, phenylsulphonyl, alkoxy of one to four carbon atoms or alkyl of one to four carbon atoms.

15. The compound according to claim 14, wherein the halogen group is chlorine or bromine.

16. The process as claimed in claim 8 wherein the coppering agent is an aqueous cupric sulphate solution containing sufficient sodium acetate present in solution to maintain the pH value above 3.

17. The process as claimed in claim 8 wherein the coppering agent is a solution of a cuprammonium salt.

* * * * *

UNITED STATES PATENT OFFICE
CERTIFICATE OF CORRECTION

Patent No. 3,700,709         Dated October 24, 1972

Inventor(s) ERIC RICHARD INMAN, IAN ALEXANDER MACPHERSON and
JOHN ANDREW STIRLING It is certified that error appears in the above-identified patent and that said Letters Patent are hereby corrected as shown below:

--Foreign Application Priority Data

May 23, 1969         Great Britain.......26504/69-- should appear somewhere in the heading of the Title page.

Signed and sealed this 3rd day of April 1973.

(SEAL)
Attest:

EDWARD M. FLETCHER, JR.                ROBERT GOTTSCHALK
Attesting Officer                      Commissioner of Patents